United States Patent
Haberer et al.

(10) Patent No.: US 8,059,263 B2
(45) Date of Patent: Nov. 15, 2011

(54) APPARATUS FOR THE RECOGNITION OF THE PRESENCE OF AN OBJECT IN SPACE

(75) Inventors: Manfred Haberer, Riegel (DE); Bernd Rothenberger, Breisach (DE)

(73) Assignee: Sick AG, Waldkirch (DE)

( * ) Notice: Subject to any disclaimer, the term of this patent is extended or adjusted under 35 U.S.C. 154(b) by 345 days.

(21) Appl. No.: 12/458,354

(22) Filed: Jul. 8, 2009

(65) Prior Publication Data

US 2010/0007870 A1    Jan. 14, 2010

(30) Foreign Application Priority Data

Jul. 9, 2008  (DE) .................. 10 2008 032 216

(51) Int. Cl.
*G01C 3/08* (2006.01)

(52) U.S. Cl. ...................................... 356/5.01; 356/28.5

(58) Field of Classification Search ............... 356/5.01
See application file for complete search history.

(56) References Cited

U.S. PATENT DOCUMENTS

| | | | | |
|---|---|---|---|---|
| 5,056,914 A * | 10/1991 | Kollodge | .................. | 356/5.05 |
| 5,194,908 A * | 3/1993 | Lougheed et al. | ............ | 356/28 |
| 5,309,212 A * | 5/1994 | Clark | ....................... | 356/5.09 |
| 5,465,142 A * | 11/1995 | Krumes et al. | ............... | 356/5.01 |
| 5,467,273 A * | 11/1995 | Faibish et al. | ................. | 701/23 |
| 5,508,510 A * | 4/1996 | Laverty et al. | ................ | 250/221 |
| 5,515,156 A | 5/1996 | Yoshida et al. | | |
| 5,680,123 A * | 10/1997 | Lee | ............................. | 340/937 |
| 5,831,717 A * | 11/1998 | Ikebuchi | .................. | 356/4.01 |
| 5,952,835 A * | 9/1999 | Coveley | .................. | 324/671 |
| 6,958,465 B2 * | 10/2005 | Haberer et al. | ............... | 250/221 |
| 7,206,063 B2 * | 4/2007 | Anderson et al. | ............ | 356/5.01 |
| 7,652,238 B2 * | 1/2010 | Haberer et al. | ............ | 250/206.1 |
| 2006/0170903 A1 * | 8/2006 | Aburmad et al. | ............ | 356/5.06 |

FOREIGN PATENT DOCUMENTS

| | | |
|---|---|---|
| DE | 43 40 765 C5 | 6/1994 |
| DE | 101 05 774 A1 | 8/2001 |
| DE | 10 2004 014 041 B4 | 10/2005 |

OTHER PUBLICATIONS

IEC 61496 A Safety Standard for Electrosensitive Protective Equipment, 1997.*

* cited by examiner

*Primary Examiner* — Thomas Tarcza
*Assistant Examiner* — Antoine J Bedard
(74) *Attorney, Agent, or Firm* — The Nath Law Group; Jerald L. Meyer; Derek Richmond

(57) ABSTRACT

An apparatus for the recognition an object in space in accordance with the pulsed time-of-flight principle. The apparatus has a pulsed laser and a photoreceiver arrangement which receives the light pulses reflected back from the object present in the space. The apparatus has a first light deflection apparatus which outputs a first angular position signal representative of its instantaneous angular position to the evaluation circuit, wherein the first light deflection apparatus is arranged rotatably or pivotably about a first axis of rotation and is made for the transmission of light pulses following one another at changing angles in a first plane, wherein a second light deflection apparatus is arranged between the first light deflection apparatus. The apparatus outputs a second angular position signal representative of its instantaneous angular position to the evaluation circuit which has a deflection plate which is arranged rotatably or pivotably about a second axis of rotation.

14 Claims, 3 Drawing Sheets

APPARATUS FOR THE RECOGNITION OF THE PRESENCE OF AN OBJECT IN SPACE

Figure 1:
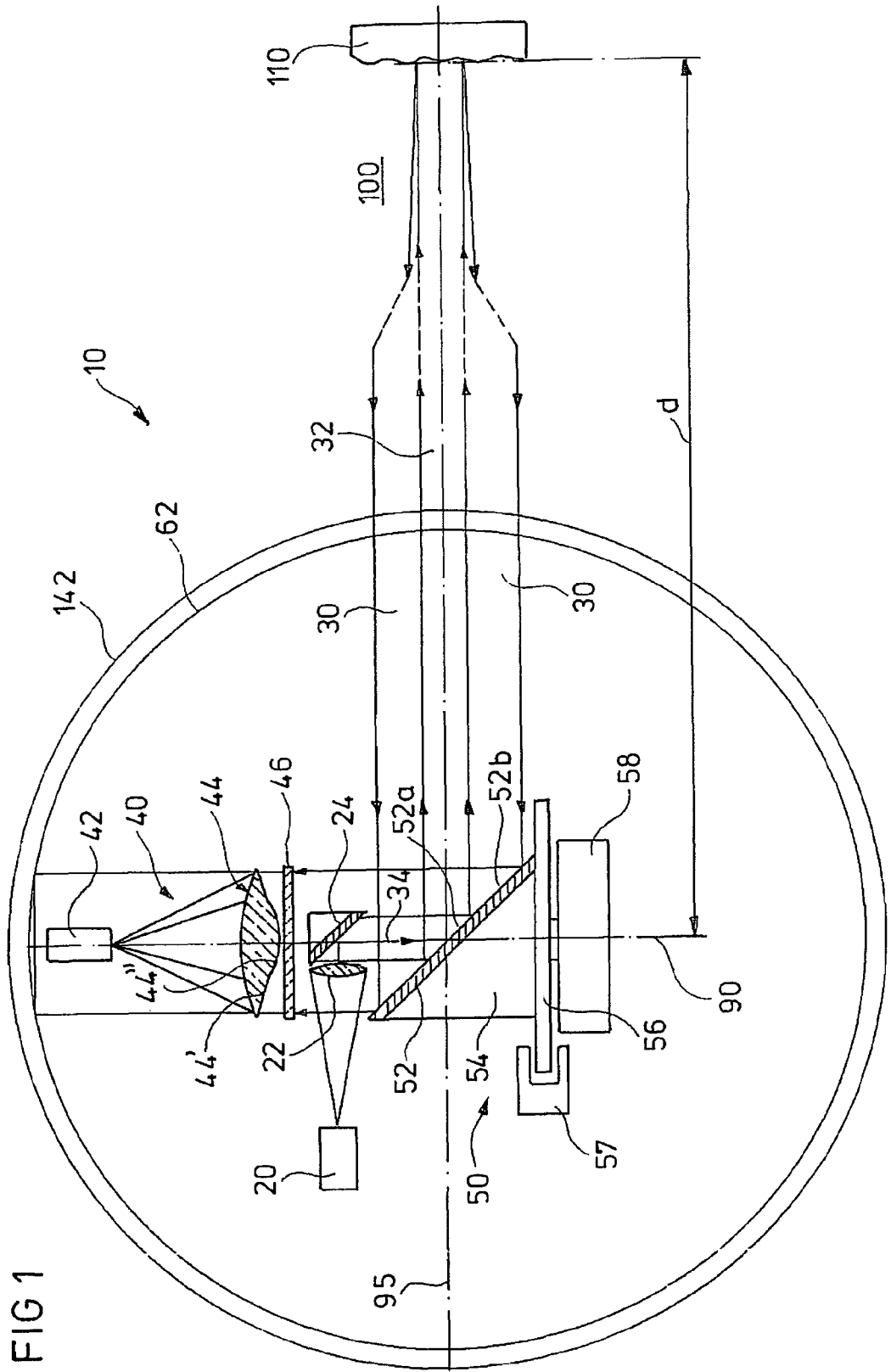

The invention relates to an apparatus for the recognition of the presence of an object in space in accordance with the preamble of claim 1.

Apparatus are known for the recognition of the presence of an object in space in accordance with the pulse time-of-flight process. They have a pulsed laser which transmits light pulses into a space in a controlled manner, a photoreceiver arrangement which receives the light pulses reflected back from the object present in the space as well as an evaluation circuit which determines a distance signal characteristic for the distance of the object from the pulsed laser from the time between the transmission and the reception of a light pulse. To be able to monitor at least one plane, a first light deflection apparatus is arranged between the space and the pulsed laser, said light deflection apparatus outputting a first angular position signal representative of its instantaneous angular position to the evaluation circuit, with the first light deflection apparatus having a deflection mirror which is arranged rotatably or pivotably about a first axis of rotation and which is made for the transmission of light pulses following one another at changing angles in a first plane and for the guidance of the light pulses reflected back to the photoreceiver arrangement. Such an apparatus can be seen, for example, from DE 43 40 756 C5.

It is, however, disadvantageous with this apparatus that the space can only be monitored in one plane, whereas it is in particular necessary in many applications in the industrial environment to secure three dimensional regions.

DE 297 24 806 U1 discloses an apparatus for the optical scanning of surfaces which has a light transmitter which transmits a light beam sweeping over a preset pivot angle range within a scanning plane, with the apparatus being pivotable about a preset rotational angle range about an axis of rotation disposed at least substantially in or parallel to the scanning plane. The angular position of the scanning plan is admittedly changed in this manner in order thus to be able to monitor a three-dimensional spatial region. It is, however, a disadvantage that the total apparatus is pivoted about an axis of rotation with the help of an external rotational device, which is complex and/or expensive to realize. In this respect, either the cables for the energy transmission are constantly moved so that they are subject to high wear. Alternatively, it is also known to use slip rings for the energy transmission which, however, are likewise subject to high wear. The same also applies to the platform for the irradiation of a laser beam disclosed in DE 33 18 686 C2.

To secure a three-dimensional region, it is also possible to combine a plurality of apparatus which each scan a plane, but which is very complicated and complex and is moreover cost-intensive.

Furthermore, optoelectronic safety sensors are known, in particular in the form of light barriers or light grids, which monitor a monitored zone for the intrusion of objects and output a signal in dependence thereon which is used to change a unit or a machine into a safe state on the occurrence of a safety demand. These safety sensors determine when a person approaches a unit or a machine and in particular encroaches beyond a critical safety distance so that in this case the machine or unit is stopped or is at least operated at reduced operating speed. These safety sensors are made as safe sensors in the sense of machine safety, which means that safe sensors or the evaluation and/or control units in association with them have to satisfy the relevant standards EN 954, EN 61496 or EN 61508; for example have to have a two-channel structure, test structures or self-testing structures or have otherwise to be able to continue to work reliable even when errors occur and to recognize the errors independently. It is in particular of great relevance with such safety sensors not only to detect that a person is approaching a machine and is encroaching beyond a safety distance, but also in particular to determine the direction from which and at which speed the person is approaching this machine or unit in order to correspondingly control, reduce or fully stop the movements of the unit or machine causing danger. In particular when a person approaches a machine or unit at high speed, it must be switched correspondingly fast to a safe state so that there is no danger for the corresponding person at any time.

Furthermore, work is currently being carried out intensively on other apparatus for the monitoring of a three-dimensional spatial region, wherein the 3D camera technology should be used. This is, however, encountering considerable difficulties since, on the one hand, 3D cameras have to be provided which are technically very complex and, on the other hand, it is very difficult to design such cameras so safely that they satisfy the named safety standards. First approaches have admittedly been made, as is described, for example, in EP 1 543 270 and EP 1 269 762; however, such camera systems have not yet been fully certified and are by no means accepted due to their complexity.

It is therefore the object of the invention to provide an apparatus for the recognition of the presence of an object in space which can monitor a three-dimensional region and is moreover simple and cost-effective. An apparatus for the recognition of the presence of an object in space should in particular be provided which can be made as a safe apparatus in a simple manner.

The object is satisfied in accordance with the invention by an apparatus for the recognition of the presence of an object in space having the features of claim 1.

Advantageous aspects and further developments are set forth in the dependent claims.

The invention is based on the recognition of not rotating or pivoting the whole apparatus which can carry out a scan in one plane about an axis of rotation for the monitoring of a three-dimensional space, but rather only to rotate or pivot the measuring head of the apparatus by a second light deflection apparatus, with the measuring head in particular including the first light deflection apparatus as well as preferably the pulsed laser and the photoreceiver arrangement and, optionally, parts of a control and/or of an evaluation circuit. Energy supplies, connectors or connector cables, operating elements or the housing of the apparatus, preferably also most parts of the evaluation circuit, are not moved in order to keep the number of moving parts as small as possible and thus to be able to configure the apparatus in as compact and as simple a manner as possible.

In the apparatus in accordance with the invention for the recognition of the presence of an object in space, a second light deflection apparatus is therefore arranged between the first light deflection apparatus and an energy supply of the first light deflection apparatus, said second light deflection apparatus outputting a second angular position signal representative of its instantaneous angular position and having a deflection plate which is arranged rotatably or pivotably about a second axis of rotation and which is made for the changing of the angular position of the first plane, with the evaluation circuit determining the position of the object in space from the first angular position signal, the second angular position signal and the distance signal.

In addition, the apparatus in accordance with the invention is completely arranged in a housing having a window. No movable components are thus visible to the outside so that the apparatus can be used in any desired environments with a correspondingly designed housing, in particular with correspondingly sealed housings. The front plate is in this respect transparent for the light transmitted by the pulsed laser.

The apparatus in accordance with the invention thus has the advantage that the laser scanner technique, which is a tested and certified technique established in safety engineering and which is moreover largely accepted, can be used to monitor a three-dimensional space in a cost-effective and reliable manner, which is not possible with the 3D camera technique.

The first light deflection apparatus can be arranged in a first embodiment such that it rotates the unit of pulsed laser and photoreceiver arrangement. However, particularly preferably, the first light deflection apparatus is arranged between the space and the pulsed laser and has a deflection mirror which is arranged rotatably or pivotably about the first axis of rotation and which is made for the transmission of light pulses following one another at changing angles in a first plane and for the guidance of the light pulses reflected back onto the photoreceiver arrangement so that the unit of pulsed laser and photoreceiver arrangement does not have to be rotated by the first light deflection apparatus, but rather only the light pulses transmitted by the pulsed laser are correspondingly deflected by the first light deflection apparatus. Particularly preferably, the first and second axes of rotation are arranged perpendicular to one another, which simplifies the construction design of the apparatus and makes a symmetrical scanning of the space possible. In addition, this has the advantage that, with a suitable choice of the rotational frequencies of the first and second light deflection apparatus, the resolution is higher in the direction of the second axis of rotation than in the direction at an angle to or transverse to the second axis of rotation since, on each rotation of the first light deflection apparatus about the first axis of rotation, at least one light pulse is transmitted substantially in the direction of the second axis of rotation.

The first light deflection apparatus is preferably arranged on the deflection plate so that the first light deflection apparatus is rotated or pivoted about the second axis of rotation in order in this manner to transmit light pulses into a three-dimensional spatial zone.

Particularly preferably, the pulsed laser and/or the photoreceiver device are fixedly arranged on the deflection plate so that a simple and compact design is achieved.

The deflection mirror and/or the deflection plate preferably has/have a deflection angle of more than 180°, preferably of more than 270°, in particular of 360°, to be able to monitor a spatial angular zone which is as large as possible.

In accordance with a particularly preferred embodiment of the invention, the deflection mirror is made as a rotating mirror and/or the deflection plate is made as a turntable since a continuous rotational movement can, for example, be realized more easily and more cost-effectively than a pivot movement over a specific pivot angular range.

In accordance with a particularly preferred embodiment of the invention, the energy transmission between moving and non-moving components of the apparatus, in particular the energy transmission from the energy supply of the first light deflection apparatus to the first light deflection apparatus, takes place in a contactless manner, in particular inductively, so that no wear occurs and a reliable energy transmission is ensured.

Particularly preferably, the data transmission between moving and non-moving components of the apparatus takes place in a contactless manner, in particular inductively, capacitively or optically, for example by means of infrared light. In this manner, wear is prevented, on the one hand, and a reliable data transmission is ensured on the other hand.

In accordance with an advantageous aspect of the invention, the apparatus is made as a safe apparatus; it is in particular made in accordance with the standards EN 61496, EN 61508 or EN 954.

A respective incremental encoder is preferably provided for the determination of the angular position of the deflection mirror and/or of the deflection plate which is preferably made as a safe incremental encoder to be able to ensure a safe detection of the angular positions and thus of the position of the object in space.

In a further development of the invention, at least one light-reflecting or light-scattering test body is arranged within the housing for the monitoring of the function of the apparatus such that the light pulses transmitted by the pulsed laser are incident onto the test body and are reflected back into the photoreceiver arrangement at at least one defined angular position of the first and/or second light deflection apparatus. A comparison of the signal generated by the test body in the photoreceiver arrangement with reference signals in particular takes place to check that the apparatus is working properly.

A further possibility for the checking of the function of the apparatus is provided by a test light source which is arranged such that the light beams transmitted by the test light source are detected in the photoreceiver arrangement at at least one defined angular position of the first and/or second light deflection apparatus and are there likewise in particular able to be compared with reference signals.

To be able to reliably detect the position of an object in space, a light pulse duration is in particular required which is so short that the apparatus can be considered more or less stationary during the transmission of the corresponding light pulse. The light pulse duration of the pulsed laser therefore preferably amounts to 1 to 5 ns, preferably 2 to 4 ns, in particular approximately 3 ns.

So that a short response time is achieved to ensure that no objects can intrude unnoticed into the space, the first light deflection apparatus, in particular the deflection mirror, has a first rotational frequency of approximately 20 to 100 Hz, in particular of approximately 50 Hz. The second light deflection apparatus, in particular the deflection plate, preferably has a second rotational frequency of approximately 1 to 15 Hz, in particular of approximately 5 Hz. Both the first rotational frequency and the second rotational frequency are preferably variably adjustable to be able to adapt the apparatus to the corresponding applications.

In accordance with a preferred embodiment of the invention, the window is at least partly made as part of a spherical surface, in particular as a hemisphere so that a 3600 monitoring is possible in one plane and a 180° monitoring of a three-dimensional space in the plane perpendicular thereto.

The diameter of the deflection plate is preferably slightly smaller than the diameter of the hemispherical window, whereby it is in particular made possible to arrange the deflection plate in a sectional plane of the hemispherical window to achieve a structure of the apparatus in this manner which is as simple and as compact as possible.

A particularly simple possibility for the monitoring of the window of the apparatus, in particular of the contamination of the window, results in that the signals of the light pulses reflected back by the window are compared with a reference signal in a comparator, with the reference signal being the signal of the light pulse reflected back at a clean window. Due to the fact that the window is permeated by light pulses in a tight pattern, a reliable monitoring of the total window is achieved in a simple manner. A monitoring of function in particular thus also takes place constantly with a clean window.

Figure 2:
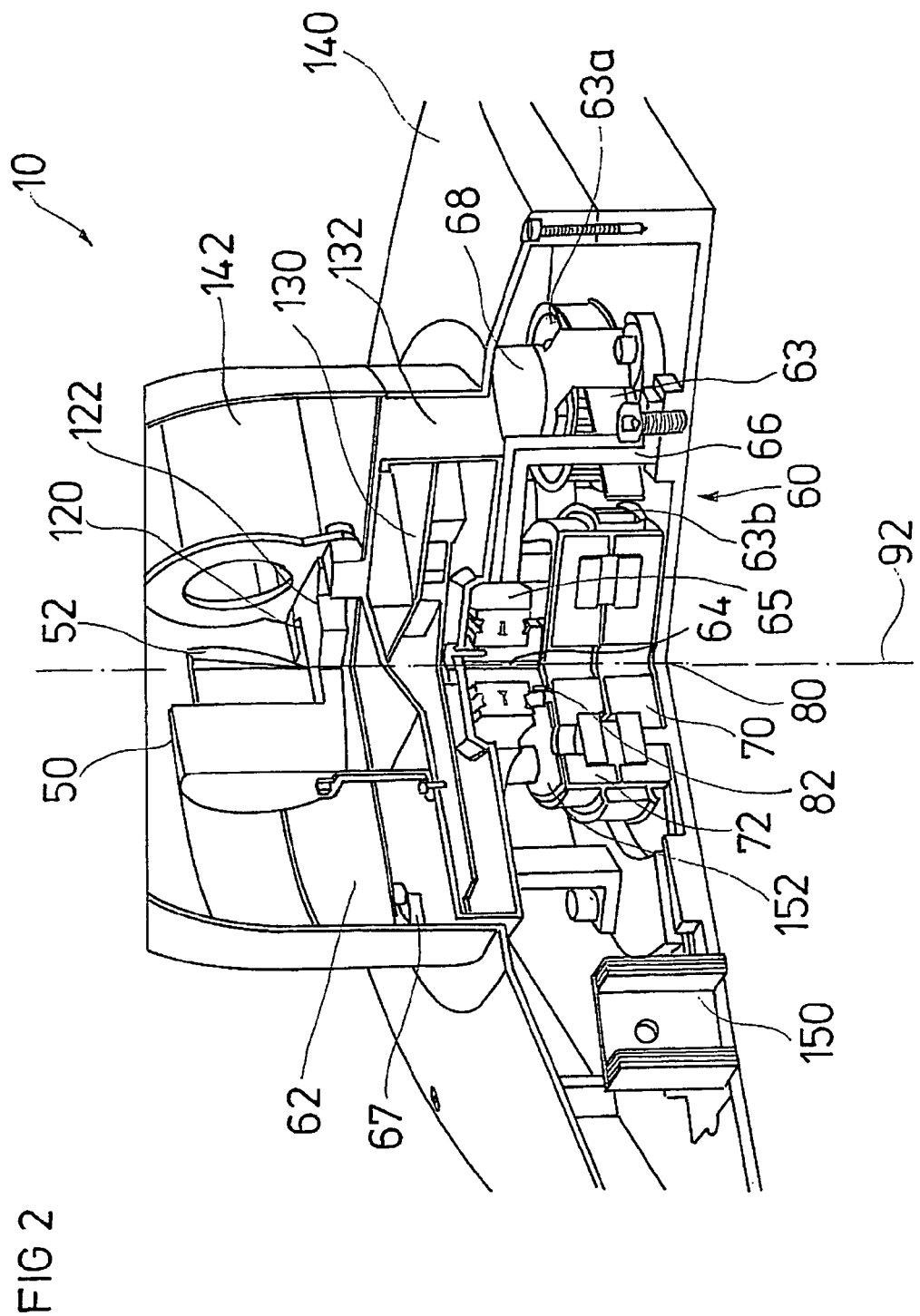
Figure 3:
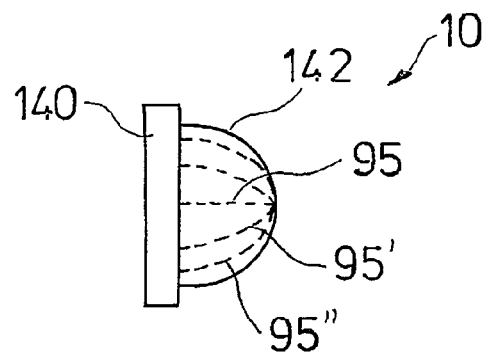
Figure 4:
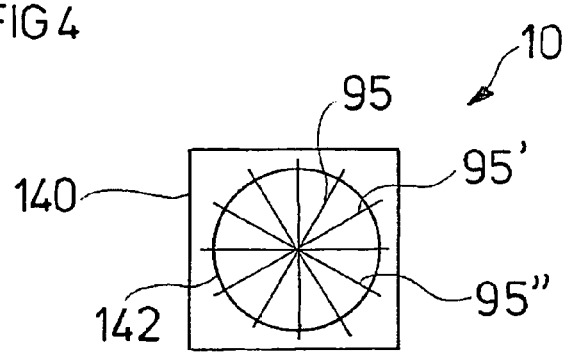

The invention will be explained in detail with reference to the following Figures. There are shown FIG. 1 a schematic plan view of an embodiment of an apparatus in accordance with the invention;

FIG. 2 a perspective, partly sectioned representation of the embodiment in accordance with FIG. 1;

FIG. 3 a schematic side view of the embodiment in accordance with FIG. 2;

FIG. 4 a schematic plan view of the embodiment in accordance with FIG. 2; and

Figure 5:
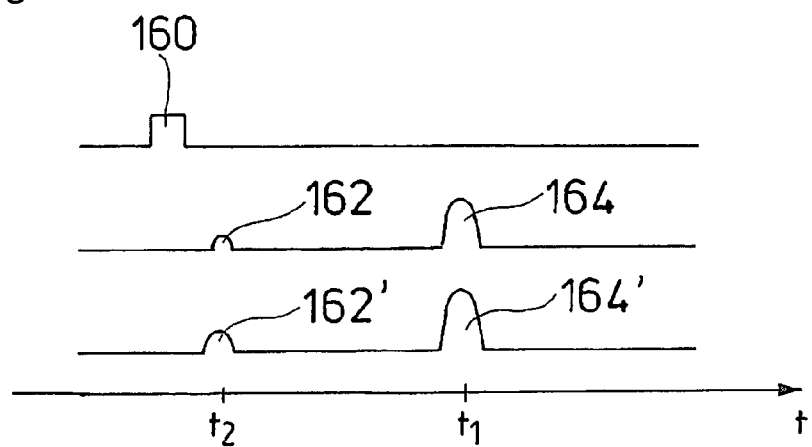

FIG. 5 a signal-time diagram of different signals.

FIGS. 1 to 4 show different views of an apparatus 10 for the determination of the position of an object 110 in the space 100, with the same reference numerals designating the same parts, but with not all reference numerals being given in all Figures for better clarity.

The apparatus 10 has a pulsed laser 20 which transmits light pulses into the space 100 in a controlled manner. The angular position of the transmitted light pulses in the space 100 is determined by a first light deflection apparatus 50 and a second light deflection apparatus 60.

The first light deflection apparatus 50 has a first motor 58 which drives a rotatable plate 56 to a continuous circulating movement about a first axis of rotation 90. A circular cylindrical body 54 is arranged on the rotatable plate 56 and its upper end surface is made as a deflection mirror 52, with the end surface being arranged at an angle of 45° to the first axis of rotation 90. Alternatively, the deflection mirror 52 can also be made as a planar mirror plate which is arranged accordingly on the rotatable plate 56.

A first incremental encoder 57 is arranged at the circumference of the rotatable plate 56 and can, for example, be made as a forked light barrier. The first incremental encoder 57 is in particular made as a safe incremental encoder so that a reliable detection of the angular position of the rotatable plate 56 and thus of the deflection mirror 52 is possible at any time.

A redirection mirror 24 is arranged above the deflection mirror 52 and its mirror surface is likewise arranged at an angle of 45° to the first axis of rotation 90. The redirection mirror 24 can likewise be made as an end surface of a circular cylindrical body or as a planar mirror plate. The redirection mirror 24 has a smaller surface than the deflection mirror 52. In the region of the point of intersection of the first axis of rotation 90 with the redirection mirror 24, the light of the pulsed laser 20 bundled by a transmission lens 22 is incident approximately perpendicular to the first axis of rotation 90 onto the redirection mirror 24 and is guided along the first axis of rotation 90 onto the deflection mirror 52 of the first light deflection apparatus 50. The deflection mirror 52 deflects the light pulses of the pulsed laser 20 substantially perpendicular to the first axis of rotation 90.

The light bundle 30 generated in this manner enters into the space 100 and is, for example, reflected or scattered at the light-reflecting or light-scattering object 110 into a received light bundle 32 from where it moves in the sense of an auto-collimation beam path back to the deflection mirror 52. Since the received light bundle 32 is as a rule fanned out more widely than the transmitted light bundle 30, it is also incident to the side of a central region 52a of the deflection mirror 52 which is in particular formed around the point of intersection of the first axis of rotation 90 with the deflection mirror 52 and onto which the transmitted light bundle 30 and in particular a central incidence light beam 34 of the light pulse transmitted by the pulsed light laser 20 is incident is incident in a ring region 52b of the deflection mirror 52 in order to be reflected past the redirection mirror 24 along the first axis of rotation 90 to an interference filter 46 of a photoreceiver arrangement 40. A reception lens 44, which has regions 44', 44" of different focal length in order also to be able to properly recognize objects 110 arranged very close to the apparatus 10, is located before a photoreceiver 42 in the beam path after the interference filter 46. The light pulses incident on the photoreceiver 42 generate signals which can be forwarded to an evaluation circuit and can be processed there.

The transmitted light bundle 30 is deflected by 360° in a first plane 95 by rotation of the deflection mirror 52 about the first axis of rotation 90.

As can in particular be seen in FIG. 2, the first light deflection apparatus 50, including the pulsed laser 20 and the photoreceiver arrangement 40, is arranged on a deflection plate 62, with the first axis of rotation 90 extending substantially parallel to the surface of the deflection plate 62. Only the light pulses which are not deflected by the deflection mirror 52 on a straight line intersecting the deflection plate 62 can exit the apparatus 10 into the space 100 so that a scan zone of approximately 180° results through the first light deflection apparatus, i.e., the region above the deflection plate 62.

The second light deflection apparatus 60 can in particular be recognized in detail in FIG. 2. The deflection plate 62 can be rotationally fixedly connected to a shaft 64 either directly or, as shown in FIG. 2, via a housing 132 described in more detail in the following, said shaft being driven via a belt 63 of a belt drive which is set into continuous circulating motion via a second motor 68. In this respect, the belt 63 runs over a first wheel 63a and a second wheel 63b, with the motor 68 driving the first wheel 63a and the second wheel 63b which is rotationally fixedly connected to the shaft 64 being driven via the belt 63. In this respect, the deflection plate 62 rotates about a second axis of rotation 92 which in particular extends concentrically through the shaft 64. A second incremental encoder 67, which is likewise preferably made as a safe incremental encoder 67, is arranged at the deflection plate 62 in order to be able to ensure a reliable determination of the angular position of the deflection plate 62 at any time.

The shaft 64 is guided by a ball bearing 65 which is held in a fixed position via support elements 66, which provides a support of the shaft 64 and which in particular prevents pronounced positional changes of the shaft 64 and thus of the deflection plate 62, for example by vibrations.

The measuring head of the apparatus 10, i.e. the first light deflection apparatus 50 including the pulsed laser 20 and the photoreceiver arrangement 40, is arranged on the deflection plate 62 of the second light deflection apparatus 60. On rotation of the deflection plate 62 about the second axis of rotation 92, a scanning angular range of 360° is realized. The first plane 95 is in particular rotated about the second axis of rotation 92 by the rotation of the deflection plate 62 so that the transmission of the light pulses of the pulsed laser 20 takes place into the space 100. As can in particular be seen with reference to FIG. 4, the first plane 95 is rotated into different positions 95', 95" on a rotation of the deflection plate 62, with the total spatial zone already being covered on a continuous rotation of the deflection plate 62 by only 180°.

A window 142, which is part of a housing 140 in which the apparatus 10 is arranged, arches approximately hemispherically above the deflection plate 62. The diameter of the spherical window 142 is in this respect slightly larger than the diameter of the deflection plate 62, with the deflection plate 62 being arranged in a sectional plane along a diameter of the window 142. In this manner, a compact structure results, on the one hand; on the other hand, the unimpeded irradiation of light pulses through the window 142 into the space 100 is possible.

FIG. 3 shows the points of intersection of the light pulses transmitted in the first plane 95 with the window 142 in a side representation so that it can in particular be seen that light pulses are irradiated in every spatial direction so that a three-dimensional monitoring of the space 100 is possible.

The housing 132 in which a control 130 for the pulsed laser 20 as well as the measurement electronics for the photoreceiver arrangement 40 are arranged is beneath the deflection plate 62 and is rotationally fixedly connected to the deflection plate. Said measurement electronics rotate together with the deflection plate 62 and are rotationally fixedly connected to the shaft 64 via the housing 132.

The data and energy transmission between the moving components of the apparatus 10, in particular the deflection plate 62 with the measuring head of the apparatus 10, which in the present case includes the pulsed laser 20, the photoreceiver arrangement 40 and the first light deflection apparatus 50, and the non-moving components of the apparatus 10 takes place in a contactless manner.

The energy transmission takes place inductively via a first ferrite shell 70 and a second ferrite shell 72. The first ferrite shell 70 is arranged within the second wheel 63b of the belt drive, said second wheel being rotationally fixedly connected to the driving shaft 64 and being fixedly connected to the housing 140 of the apparatus 10 so that it does not rotate with the wheel 63b. The second ferrite shell 72 is arranged above the first ferrite shell 70 within the second wheel 63b of the belt drive such that it is also rotated on a rotation of the second motor 68 of the second light deflection apparatus 60 and thus on a rotation of the second wheel 63b and thus moves relative to the first ferrite shell 70 in order in this manner to enable an inductive energy transmission from the non-moving components of the apparatus 10 to the moving components of the apparatus 10, in particular from an energy supply to the first light deflection apparatus 50 and, if necessary, to the pulsed laser 20 and the photoreceiver arrangement 40. For this purpose, in particular the first ferrite shell 70 is connected to a first electronic unit 150 which is likewise arranged stationary in the housing 140 and the second ferrite shell 72 is connected to a second electronics module 152 which counts among the moving components and can, for example, be arranged in or at the housing 132.

A first infrared interface 80 is part of the first electronics module 150; a second infrared intersection 82 is part of the second electronics module 152 and data can be transmitted via it in a contactless manner by means of infrared light between the moving and non-moving components of the apparatus 10. For this purpose, in particular the second electronics module 152 is connected to the control 130 for data exchange so that, for example, the signals detected by the photoreceiver arrangement 40 can be forwarded via the second electronics module 152 and the second infrared interface 82 to the first infrared interface 80 and to the first electronics module 150 in the fixed position housing 140. The contactless data and energy transmission has the great advantage that the rotation of the second light deflection apparatus 60 can take place without impediment and, additionally, no wear of parts takes place such as would, for example, be the case on the use of slip rings. This furthermore makes it possible to make the apparatus 10 as a safe apparatus since the data and energy transmission can be tested in test cycles in a simple manner and can thus continuously be ensured, which is, for example, not the case on the use of slip rings.

The control 130 causes the pulsed laser 20 to output light pulses 160, for example of a duration of 3 to 4 ns.

The control 130 furthermore controls the first rotational frequency of the deflection mirror 62, for example in the range from approximately 20 to 100 Hz, with a first rotational frequency being particularly preferred, for example, of approximately 50 Hz. The corresponding commands for the control can, however, also be forwarded from the electronics module 150 to the control 130 via the infrared interfaces 80, 82. The deflection plate 92 also preferably has a variable rotational frequency, for example in the range of approximately 1 to 15 Hz, with a rotational frequency of approximately 5 Hz being particularly preferred, for example. Since light pulses are transmitted in the direction of the second axis of rotation 92 on every rotation of the first light deflection 50 about the first axis of rotation 90, the density of the light pulses in the direction of the second axis of rotation 92 is larger than in the direction approximately perpendicular to the second axis of rotation 92. A higher resolution hereby results in the direction of the second axis of rotation 92, which as a rule faces in the direction of view of the apparatus 10, than at an angle to or transversely to the direction of view. On a first rotational frequency of approximately 25 Hz and a second rotational frequency of approximately 5 Hz, a response time of 40 ms can be achieved in the direction of the second axis of rotation 92, whereas a response time of still approximately 100 ms can be achieved in the direction approximately perpendicular to the second axis of rotation 92, which is, however, completely sufficient for safety engineering applications.

Light pulses 160 are transmitted into the space 100 via the transmission lens 22 and the redirection mirror 24. They are received as received signal 164, 164' by the photoreceiver arrangement 40 on reflection at the object 110 present in the space 100 after a time of flight t1 (cf. FIG. 5). The distance d of the object 110 from the apparatus 10 can be determined from the time of flight t1 and the speed of light. As can be seen in FIG. 5, a smaller received signal 162, 162' can be recognized, with this time of flight t2 corresponding to an object at a distance of half the diameter of the deflection plate and this received signal 162, 162' thus corresponding to the back reflection of the light pulse 160 at the window 142.

On the output of a light pulse 160, the angular position of the deflection mirror 52 detected by the first incremental encoder 57 and the angular position of the deflection plate 62 detected by the second incremental encoder 67 are simultaneously stored. On detection of a received signal 164, 164', 162, 162', not only the distance d of the object 110 from the apparatus 10 can thus be determined from the time of flight t1, t2, but also the relative position of the object 110 in the space 100. This information can be used for the most varied application purposes.

On the one hand, it is possible to attach the apparatus 10 to a fixed position in the space and to safely recognize the presence of an object in the space with the apparatus 10. In addition, a check can be made where precisely the object is located, with a check in particular being able to be made whether this object is located inside or outside a defined protective field. On the presence of the object within danger zones, a switch signal can then be generated which results in the switching off of a dangerous machine or at least on the switching of the machine into a non-dangerous state.

It is furthermore possible to attach the apparatus 10 to a self-propelling vehicle and to check with the apparatus 10 whether there are obstacles in the direction of travel.

If an obstacle is present, which is in particular located within a predefined distance from the vehicle, the vehicle is braked or stopped in order to prevent collisions in this manner.

Finally, it is also possible to use the apparatus 10 for the provision of a navigation signal for self-propelling vehicles. The spatial contour surrounding the vehicle is detected with the help of the apparatus 10 and is used for the control of the vehicle. It can, for example, be required that the vehicle moves between two track boundaries which can, for example, be provided by corresponding markings on the floor, with the track boundaries being detected with the help of the apparatus 10. A protected field can be defined in front of the vehicle. For example, as soon as the track boundaries are disposed within the protected field, a corresponding counter-control movement can be initiated to cause the vehicle to move substantially always between the track boundaries.

To test the operation of the pulsed laser 20 regularly and thus to satisfy the demands of the relevant safety standards, a test body 120 and a test light source 122 are arranged on the deflection plate 62 in the region which is swept over by light pulses transmitted by the pulsed laser 20 on rotation of the deflection mirror 52. The test body 120 has a defined reflection or scattering behavior and produces a defined signal in the photoreceiver arrangement 40 with a properly aligned light deflection arrangement 50 as well as a properly functioning pulsed laser 20. On every rotation of the deflection mirror 52, light pulses are incident onto the test body 120 and the light reflected back by the test body 120 is detected in the photoreceiver arrangement 40 and is compared with the desired signal. If a deviation is detected, a defect can be assumed so that, for example, an alarm can immediately be triggered which indicates the defect. The test light source 122 also generates a signal in the photoreceiver arrangement 40 at a specific angular position of the deflection mirror 52, said signal being able to be checked on every rotation of the deflection mirror 52 and being able to be compared with a corresponding reference signal to check the alignment of the light deflection apparatus 50.

In accordance with the relevant safety standards, it is furthermore required that a possibility is provided to check the apparatus 10 with respect to the question whether the window 142 is contaminated. Since the total window 142 is permeated by the light pulses in a tight pattern due to the transmission of light pulses in all spatial directions, the back reflection 162, 162' of the light pulses when passing through the window 142 is used for checking the contamination of the window 142. If the window 142 is clean, a defined received signal 162 is generated in the photoreceiver arrangement 40 by the light pulse scattered at the window 142. In normal operation, the corresponding received signal 162', which is produced by reflection at the window 142, for each transmitted light pulse is compared with a stored reference signal which corresponds to the received signal 162 of a clean window 142. If a dirt layer is deposited on the window 142 or if a region of the window 142 is blocked by other coverings, the received signal 162' of the light pulse reflected back at the window 142 detected in the photoreceiver arrangement 40 differs from the stored reference signal so that a contamination of the window 142 of the apparatus 10 can be assumed. In this manner, a simple and reliable possibility is provided to monitor the contamination of the window 142.

REFERENCE NUMERAL LIST 10 apparatus
20 pulsed laser
22 transmission lens
24 redirection mirror
30 transmitted light bundle
32 received light bundle
34 central incidence light beam
40 photoreceiver arrangement
42 photoreceiver
44, 44', 44" receiver lens
46 interference filter
50 first light deflection apparatus
52 deflection mirror
52a central region
52b ring region
54 circular cylinder
56 rotating plate
57 first incremental encoder
58 first motor
60 second light deflection apparatus
62 deflection plate
63 belt
63a first wheel
63b second wheel
64 shaft
65 ball bearing
66 support element
67 second incremental encoder
68 second motor
70 first ferrite shell
72 second ferrite shell
80 first infrared interface
82 second infrared interface
90 first axis of rotation
92 second axis of rotation
95, 95', 95" first plane
100 space
110 object
120 test body
122 test light source
130 control
132 housing
140 housing
142 window
t, t1, t2 time of flight
d distance
160 light pulse
162, 162' received signal
164, 164' received signal

The invention claimed is:

1. An apparatus (10) for the recognition of the presence of an object (110) in space (100) in accordance with the pulsed time-of-flight method having a pulsed laser (20) which transmits light pulses into the space (100) in a controlled manner, having a photoreceiver arrangement (40) which receives the light pulses reflected back from the object (110) present in the space, having an evaluation circuit which determines a distance signal characteristic for the distance (d) of the object (110) from the pulsed laser (20) from the time (t) between the transmission and the reception of a light pulse, and having a first light deflection apparatus (50) which outputs a first angular position signal representative of its instantaneous angular position to the evaluation circuit, wherein the first light deflection apparatus (50) is arranged rotatably or pivotably about a first axis of rotation (90) and is made for the transmission of light pulses following one another at changing angles in a first plane (95), characterized in that a second light deflection apparatus (60) is arranged between the first light deflection apparatus (50) and an energy supply of the first light deflection apparatus (50) which outputs a second angular position signal representative of its instantaneous angular position to the evaluation circuit and which has a deflection plate (62) which is arranged rotatably or pivotably about a second axis of rotation (92) and which is made for the changing of the angular position of the first plane (95), with the evaluation circuit determining the position of the object (110) in the space (100) from the first angular position signal, the second angular position signal and the distance signal, and with the apparatus (10) being arranged in a housing (140) having a window (142).

2. An apparatus in accordance with claim 1, characterized in that the first light deflection apparatus (50) is arranged between the space (100) and the pulsed laser (20) and has a deflection mirror (52) which is arranged rotatably or pivotably about the first axis of rotation (90) and which is made for the transmission of light pulses following one another at changing angles in a first plane (95) and for the guidance of the light pulses reflected back to the photoreceiver arrangement (40).

3. An apparatus in accordance with claim 1, characterized in that the first and the second axes of rotation (90, 92) are arranged perpendicular to one another.

4. An apparatus in accordance with claim 1, characterized in that the first light deflection apparatus (50) is arranged on the deflection plate (62).

5. An apparatus in accordance with claim 1, characterized in that the pulsed laser (20) and/or the photoreceiver arrangement (40) is/are fixedly arranged on the deflection plate (62).

6. An apparatus in accordance with claim 1, characterized in that the deflection mirror (52) and/or the deflection plate (62) has/have a deflection angle of more than 180°, preferably of more than 270°, in particular of 360°.

7. An apparatus in accordance with claim 1, characterized in that the deflection mirror (52) is made as a rotating mirror and/or the deflection plate (62) is made as a turntable.

8. An apparatus in accordance with claim 1, characterized in that the energy transmission between moving and non-moving components of the apparatus (10), in particular the energy transmission from the energy supply of the first light deflection apparatus (50) to the first light deflection apparatus (50), takes place in a contactless manner, in particular inductively.

9. An apparatus in accordance with claim 1, characterized in that the data transmission between moving and non-moving components of the apparatus (10) takes place in a contactless manner, in particular inductively, capacitively or optically.

10. An apparatus in accordance with claim 1, characterized in that the apparatus (10) is made as a safe apparatus; is in particular made in accordance with the standards EN 61496, EN 61508 or EN 954.

11. An apparatus in accordance with claim 1, characterized in that at least one light-reflecting or light-scattering test body (120) is arranged such that the light pulses transmitted by the pulsed laser are incident on the test body (120) at defined angular positions of the first and/or second light deflection apparatus (50, 60) and are reflected back into the photoreceiver arrangement (40).

12. An apparatus in accordance with claim 1, characterized in that the first light deflection apparatus (50), in particular the deflection mirror (52), has a first rotational frequency of approximately 20 to 100 Hz, in particular of approximately 50 Hz, with preferably the first rotational frequency being variably adjustable; and/or in that the second light deflection apparatus, in particular the deflection plate (62) has a second rotational frequency of approximately 1 to 15 Hz, in particular of approximately 5 Hz, with the second rotational frequency preferably being variably adjustable.

13. An apparatus in accordance with claim 1, characterized in that the window (142) is made at least partly as a part of a spherical surface, in particular as a hemisphere.

14. An apparatus in accordance with claim 1, characterized in that a comparator is provided in which the signals of the light pulses reflected back by the window (142) are compared with a reference signal, with the reference signal being the signal of the light pulse reflected back at a clean window (142).

* * * * *